US009645772B2

(12) United States Patent
Otsuka

(10) Patent No.: US 9,645,772 B2
(45) Date of Patent: May 9, 2017

(54) COMPUTER-READABLE RECORDING MEDIUM, CONFIGURATION PRESENTATION METHOD, AND CONFIGURATION PRESENTATION DEVICE

(71) Applicant: Konica Minolta, Inc., Tokyo (JP)

(72) Inventor: Takashi Otsuka, Hyogo-ken (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/835,089

(22) Filed: Aug. 25, 2015

(65) Prior Publication Data

US 2016/0054956 A1 Feb. 25, 2016

(30) Foreign Application Priority Data

Aug. 25, 2014 (JP) ................................ 2014-170700

(51) Int. Cl.
*G06F 3/12* (2006.01)
*G06K 15/00* (2006.01)

(52) U.S. Cl.
CPC .......... *G06F 3/1204* (2013.01); *G06F 3/1227* (2013.01); *G06F 3/1231* (2013.01);
(Continued)

(58) Field of Classification Search
None
See application file for complete search history.

(56) References Cited

U.S. PATENT DOCUMENTS

2004/0036908 A1* 2/2004 Yagita ..................... G06F 3/121
358/1.15
2006/0050879 A1* 3/2006 Iizuka ...................... G09C 3/08
380/51

(Continued)

FOREIGN PATENT DOCUMENTS

JP 2009-104541 A 5/2009
JP 2009-223834 A 10/2009

(Continued)

OTHER PUBLICATIONS

Office Action issued in corresponding Japanese Application No. 2014-170700 dated Nov. 15, 2016, and English translation thereof (5 pages).

*Primary Examiner* — Dov Popovici
(74) *Attorney, Agent, or Firm* — Osha Liang LLP

(57) ABSTRACT

A non-transitory computer-readable recording medium having recorded thereon a printer driver allowing a computer including a nonvolatile memory to issue a print instruction causing a printing device to execute printing. The printer driver causes the computer to execute: displaying separate reception regions each corresponding to a different printing device and each including one or more configurable items that are related to printing and variable from reception region to reception region; when receiving a configuration with respect to a configurable item included in a reception region, storing the configuration to the nonvolatile memory to be associated with a printing device corresponding to the reception region; and when receiving a designation of a printing device corresponding to a reception region, reading out each configuration associated with the printing device from the nonvolatile memory, and presenting the each configuration so as to be usable in issuing a print instruction.

14 Claims, 15 Drawing Sheets

(52) U.S. Cl.
CPC .......... *G06F 3/1256* (2013.01); *G06F 3/1258* (2013.01); *G06F 3/1276* (2013.01)

(56) References Cited

U.S. PATENT DOCUMENTS

2009/0109473 A1 4/2009 Kato
2009/0237724 A1 9/2009 Furuya
2011/0063669 A1 3/2011 Kimura

FOREIGN PATENT DOCUMENTS

| | | |
|---|---|---|
| JP | 2011-065290 A | 3/2011 |
| JP | 2013-003846 A | 1/2013 |
| JP | 2013-025414 A | 2/2013 |

\* cited by examiner

FIG. 3

```
                    ,-301
<psf:PrintCapabilities -Partially omitted- >                -302
    <psf:Feature name=" psk:PageOrientation" >
        <psf:Property name=" psk:DisplayName" >
            <psf:Value xsi:type=" xsd:string" >Page orientation (N)</psf:Value>
        </psf:Property>    -303
        <psf:Property name=" psf:SelectionType" >
            <psf:Value xsi:type=" xsd:string" >psk:PickOne</psf:Value>
        </psf:Property>    -304
    <psf:Option name=" psk:Portrait" >
        <psf:Property name=" psk:DisplayName" >
            <psf:Value xsi:type=" xsd:string" >Portrait</psf:Value>
        </psf:Property>
    </psf:Option>    -305
    <psf:Option name=" psk:Landscape" >
        <psf:Property name=" psk:DisplayName" >
            <psf:Value xsi:type=" xsd:string" >Landscape</psf:Value>
        </psf:Property>
    </psf:Option>
    </psf:Feature>    -306
    <psf:Feature name=" km:JobPUNCH" >            -307
        <psf:Property name=" psf:SelectionType" >
            <psf:Value xsi:type=" xsd:string" >psk:PickOne</psf:Value>
        </psf:Property>    -308
        <psf:Option name=" km:NONE" >
        </psf:Option>    -309
        <psf:Option name=" km:NUM2" >
        </psf:Option>    -310
        <psf:Option name=" km:NUM3" >
        </psf:Option>    -311
        <psf:Option name=" km:NUM4" >
        </psf:Option>
    </psf:Feature>    -312
</psf:PrintCapabilities>
```

COMPUTER-READABLE RECORDING MEDIUM, CONFIGURATION PRESENTATION METHOD, AND CONFIGURATION PRESENTATION DEVICE

CROSS-REFERENCE TO RELATED APPLICATIONS

This application claims priority to Japanese Patent Application No. JP2014-170700 filed Aug. 25, 2014, the contents of which are hereby incorporated by reference in their entirety.

BACKGROUND

One or more embodiments of the present invention relate to a computer-readable recording medium, a configuration presentation method, and a configuration presentation device, and in particular to technology which simplifies operations that a user makes with respect to a printer driver for issuing print instructions to a plurality of types of printing devices.

In recent years, it is becoming common to share one or more image forming devices via a network such as a local area network (LAN). In such an environment, it is usual that a plurality of image forming devices are connected to the network, and it is not rare that the image forming devices connected to the network include image forming devices having functions different from each other.

In order to enable issuing print instructions to the plurality image forming devices connected to the network via a user terminal, printer drivers each corresponding to one of the image forming devices need to be installed onto the user terminal. Also, when a user switches from a first image forming device to a second image forming device and issues a print instruction to the second image forming device, the user has to switch from a first printer driver corresponding to the first image forming device to a second printer driver corresponding to the second image forming device. This makes user operations troublesome.

For instance, conventional technology (for instance, see Japanese Patent Application Publication No. 2011-065290) proposes a program which causes a port monitor receiving a print instruction from a printer driver to output the print instruction to a destination differing from a preset destination. This program enables issuing print instructions to different image forming devices from one printer driver.

However, a user switching from a first image forming device to a second image forming device of a model differing from the first image forming device may be expecting to use a function which only the second image forming device has.

Even in such a case, the conventional technology of Japanese Patent Application Publication No. 2011-065290 only changes the output destination of the same print instruction. That is, a print instruction for the second image forming device is issued by utilizing a printer driver for the first image forming device, and due to this, only print configurations related to configurable items available with the first image forming device can be made with respect to the second image forming device.

Meanwhile, another conventional technology (for instance, see Japanese Patent Application Publication No. 2009-223834) proposes an application which, when a plurality of printer drivers are installed onto a user terminal, acquires all configurable items for each of the printer drivers, classifies the configurable items into common configurable items being configurable items common among the printer drivers and unique configurable items each being unique to a given printer driver, and enables a user to make configurations based on the configurable items so classified.

Yet another conventional technology (for instance, see Japanese Patent Application Publication No. 2009-104541) proposes a device that, for each of a plurality of functions, causes a printer driver to display a text string used by an application to indicate the function, by replacing a text string used by the printer driver to indicate the function with the text string used by the application to indicate the function. This conventional device makes it easier for a user to recognize a function, regardless of whether the function corresponds to a common configurable item or a unique configurable item, and prevents the user from making erroneous operations.

However, in the conventional technology of Japanese Patent Application Publication No. 2011-065290, No. 2009-223834, and No. 2009-104541, all configurable items are displayed regardless of whether the configurable items are common configurable items or unique configurable items. This makes it difficult for a user to identify a configurable item with respect to which the user wishes to make a configuration. This results in making print configurations becoming troublesome for users.

SUMMARY

One or more embodiments of the present invention provide a computer-readable recording medium, a configuration presentation method, and a configuration presentation device which simplify user operations for issuing print instructions to a plurality of image forming devices having different functions.

One or more embodiments of the present invention is a non-transitory computer-readable recording medium having recorded thereon a printer driver allowing a computer including a nonvolatile memory to issue a print instruction causing a printing device to execute printing, the printer driver causing the computer to execute: a display step of displaying a plurality of separate reception regions, the reception regions each corresponding to a different printing device and each including one or more configurable items that are related to printing and variable from reception region to reception region; a storing step of, when receiving a configuration with respect to a configurable item included in one of the reception regions, storing the received configuration to the nonvolatile memory so that the received configuration is associated with a printing device corresponding to the one of the reception regions; and a presenting step of, when receiving a designation of one printing device corresponding to one of the reception regions, reading out each configuration associated with the one printing device from the nonvolatile memory, and presenting the each configuration so that the each configuration is usable in issuing a print instruction to the one printing device.

BRIEF DESCRIPTION OF THE DRAWINGS

These advantages and features of the invention will become apparent from the following description thereof taken in conjunction with the accompanying drawings, which illustrate one or more embodiments of the invention.

In the drawings:

FIG. 3 is one example of a PrintCapabilities document in accordance with one or more embodiments of the present invention;

DETAILED DESCRIPTION

The following describes one or more embodiments involving the computer-readable recording medium, the configuration presentation method, and the configuration presentation device pertaining to the present invention with reference to the drawings.

[1] Structure of Printing System

First, a major part of the structure of a printing system including a user terminal which executes the configuration presentation method pertaining to one or more embodiments of the present invention is described.

Figure 1:
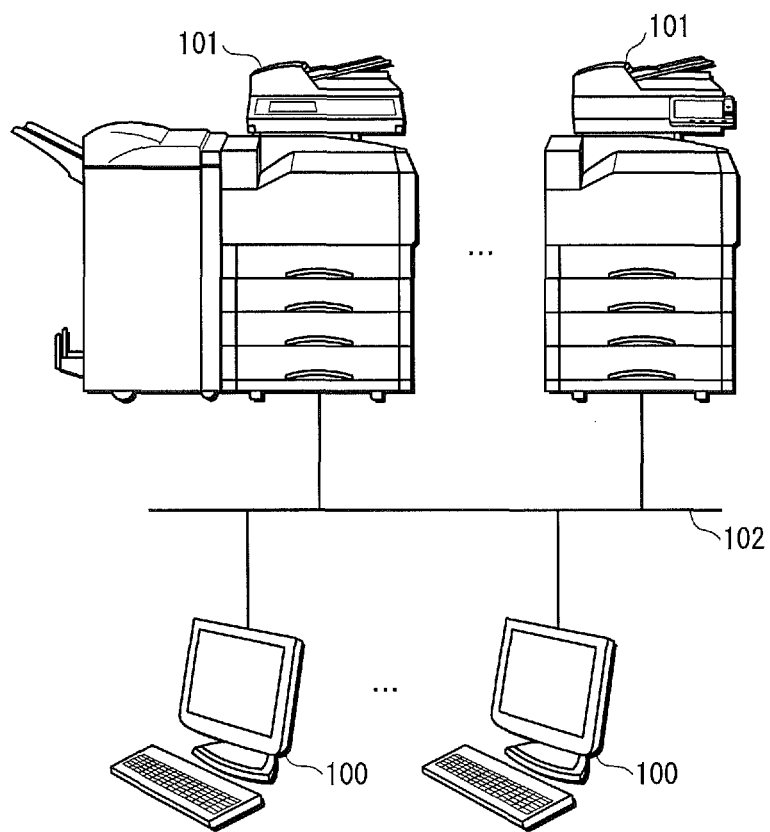
FIG. 1 illustrates a main part of the structure of a printing system pertaining to one or more embodiments of the present invention.

FIG. 1 illustrates a printing system 1 as one example of such a printing system. The printing system 1 is a system in which a plurality of user terminals 100 and a plurality of image forming devices 101 are connected via a local area network (LAN) 102 so that the user terminals 100 and the image forming devices 101 are mutually communicatable. One or more printer drivers are installed onto each one of the user terminals 100. The user terminals 100 each serve as a configuration presentation device that presents print configurations to a user via the printer drivers. The user terminals 100 also transmit printing jobs to the image forming devices 101 and cause the image forming devices 101 to execute printing.

The plurality of image forming devices 101 include image forming devices of different models. The LAN 102 may be a wired LAN or a wireless LAN. Also, instead of the LAN 102, a wide area network (WAN) or a combination of a LAN and a WAN may be utilized. In the following description, an example in which the user terminals 100 are personal computers (PCs) is described, but it goes without saying that the user terminals 100 are not limited to PCs.

[2] Structure of User Terminal 100

Next, a structure of one of the user terminals 100 is described.

Figure 2:
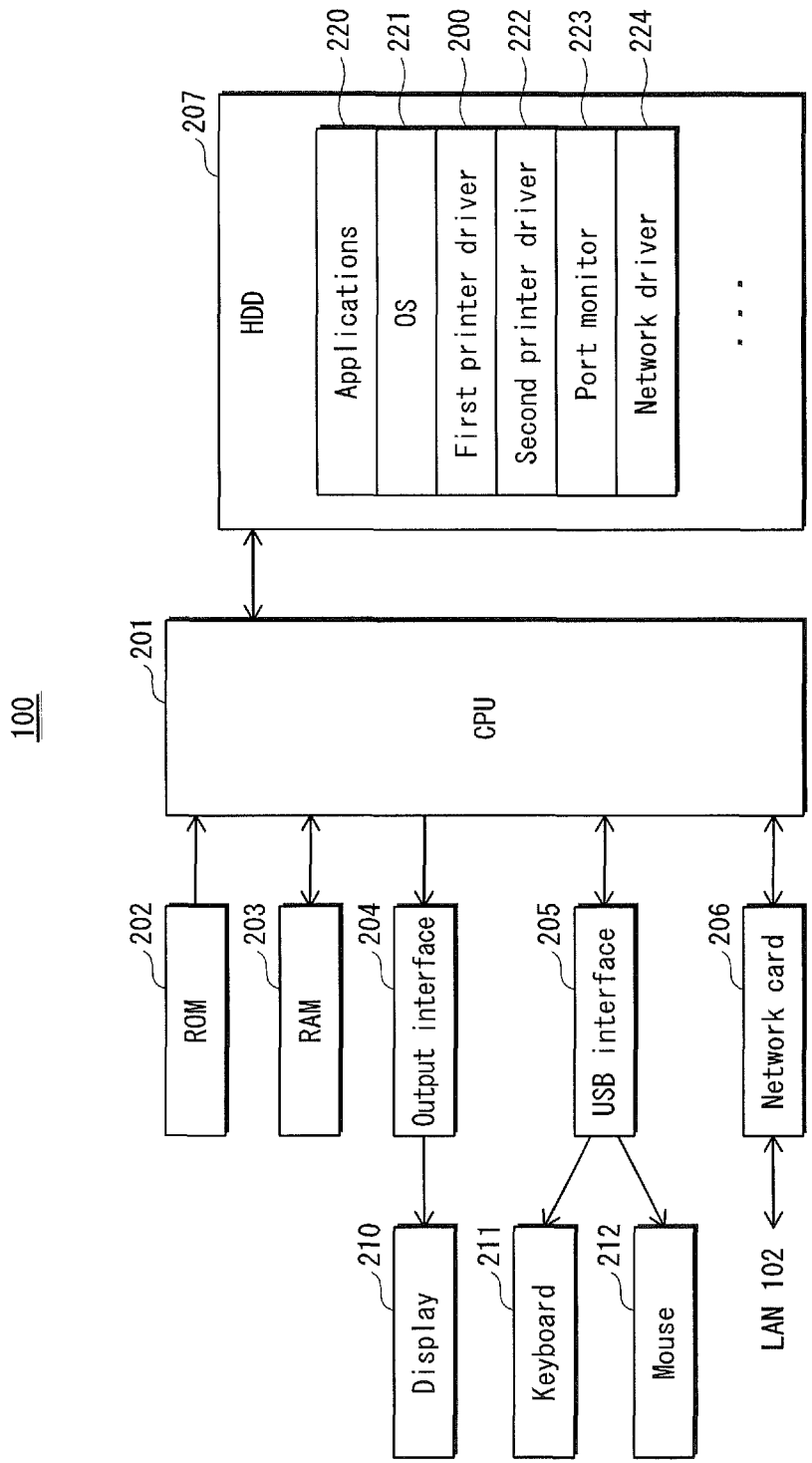
FIG. 2 illustrates an overall structure of a user terminal 100 in accordance with one or more embodiments of the present invention.

FIG. 2 illustrates a major part of the structure of the user terminal 100. As illustrated in FIG. 2, the user terminal 100 includes a central process unit (CPU) 201, a read-only memory (ROM) 202, a random access memory (RAM) 203, an output interface 204, a universal serial bus (USB) interface 205, a network card 206, and a hard disk drive (HDD) 207. The ROM 202 and the HDD 207 are nonvolatile storage devices.

The HDD 207 stores programs such as an operating system (OS) 221 which is a basic software, one or more application programs (hereinafter called, "applications") such as a document creation program 220 for creating data to be printed, a first printer driver 200 pertaining to one or more embodiments and a second printer driver 222, a port monitor 223 which outputs print data to image forming devices 101, and a network driver 224 that controls the network card 206.

When the user terminal 100 is turned on, the CPU 201 reads out a boot program from the ROM 202 and launches the boot program, and reads out the OS 221 from the HDD 207 and executes the OS 221 while utilizing the RAM 203 as a working storage region. The CPU 201 also reads out and executes programs such as the applications 220 from the HDD 207 as necessary.

The output interface 204 controls the displaying of information to the user by a display 210. In one or more embodiments, the display 210 is a liquid crystal display (LCD), but other display devices may be utilized. The USB interface 205 is an interface controlling communication between the user terminal 100 and a plurality of USB devices, and a keyboard 211 and a mouse 212 are connected to the user terminal 100 via the USB interface 205.

It goes without saying that pointing devices other than a mouse may be utilized. Also, input devices such as the keyboard 211 and the mouse 212 may be connected to the user terminal 100 via interfaces other than USB. A touch panel that is an integration of a pointing device and a display device may also be utilized as an input/output device.

The network card 206 is an interface device allowing the CPU 201 to communicate via the LAN 102 with other devices, specifically, image forming devices 101.

The first printer driver 200 and the second printer driver 222 are printer drivers, and each corresponds to a different one of the image forming devices 101. Also, the second printer driver 222 may be provided in plurality, and in such a case, the number of the second printer drivers 222 changes depending upon the number of the image forming devices 101. The applications 220 are programs used for creating document data, such as a word-processing software, a spreadsheet software, a browser, and an image process program. The applications 220 generate print data, and are capable of launching the first printer driver 200 and the second printer driver 222 for printing.

In one or more embodiments, Microsoft Windows (registered trademark of Microsoft Corporation) of Windows Vista (registered trademark of Microsoft Corporation) or a later version is utilized as the OS 221. Microsoft Windows (a registered trademark) of Windows Vista (a registered trademark) and later versions has the XML Paper Specification (XPS) printing system.

In the XPS printing system, a printer driver has the IPrintTicketProvider interface. The printer driver utilizes the IPrintTicketProvider interface to acquire a PrintCapabilities object through the GetPrintCapabilities method. A PrintCapabilities object is text data which describes, in extensible markup language (XML), each feature of a printing device (Feature) and each candidate (Option) of a configuration value of each feature.

FIG. 3 illustrates one example of a PrintCapabilities document. As illustrated in FIG. 3, PrintCapabilities tags 301 and 312, which are written at the beginning and at the end of the document respectively, indicate that this document is a PrintCapabilities document. Feature tags 302 and 306 indicate descriptions associated with features of a printing device. The tag 302 with the name "PageOrientation" is related to a function of configuring document orientation, and the tag 306 with the name "JobPUNCH" is related to a function of configuring the number of punch holes.

Option tags 304 and 305 each indicate one of two candidates of the configuration value of "Page orientation": "Portrait" and "Landscape". Option tags 308-311 each indicate one of four candidates of the configuration value of JobPUNCH: "No punching (km:NONE)", "Two-hole punching (km:NUM2)", "Three-hole punching (km:NUM3)", and "Four-hole punching (km:NUM4)".

Property tags 303 and 307 each indicate that only one among the candidates existing for a corresponding feature is selectable as the configuration value of the feature ("PickOne").

[3] First Printer Driver 200

Next, the first printer driver 200 is described.

(3-1) Structure of First Printer Driver 200

The first printer driver 200, when launched by the user, displays an operation screen on the display 210. This operation screen is a tabbed document interface (TDI). When the user clicks one of the tabs displayed i-on an upper portion of the operation screen, a screen corresponding to the selected tab is displayed.

The first printer driver 200 enables the user terminal 100 to issue print instructions to a plurality of image forming devices 101 by allowing the user to add new tabs (hereinafter called "My Tabs") each for issuing a print instruction to a different image forming device 101. Also, the first printer driver 200 can store print configurations made with respect to each My Tab, and the stored print configurations are later used in the issuing of print instructions.

Figure 4:
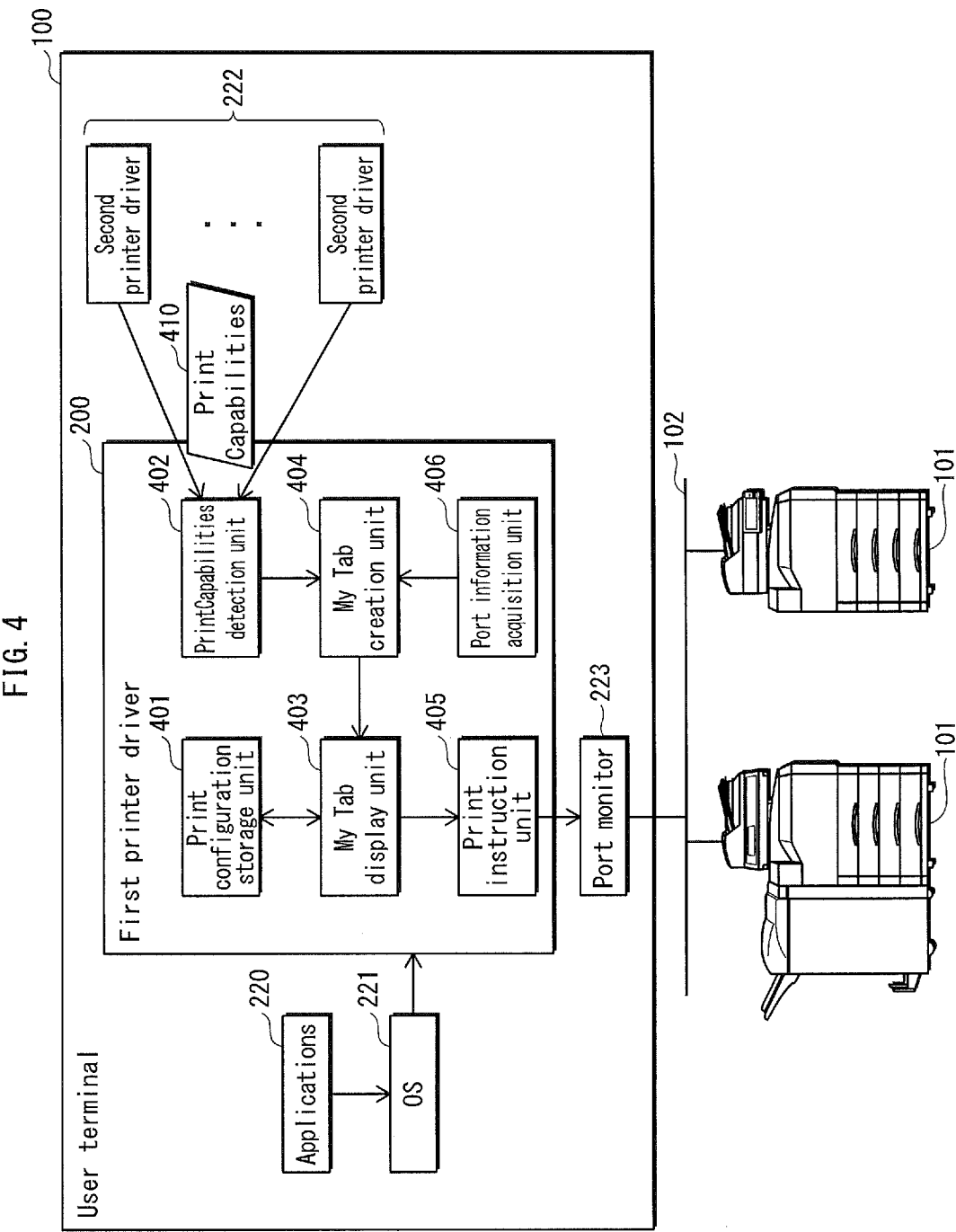
FIG. 4 illustrates a main part of the structure of a first printer driver 200 in accordance with one or more embodiments of the present invention.

Therefore, as illustrated in FIG. 4, the first printer driver 200 includes a My Tab creation unit 404 and a print configuration storage unit 401, in addition to a PrintCapabilities detection unit 402, a My Tab display unit 403, a print instruction unit 405, and a port information acquisition unit 406. The first print driver 200, or more specifically, the PrintCapabilities detection unit 402 is capable of acquiring a PrintCapabilities document from the second printer device 222. Further, when the first printer driver 200 receives print data from one of the applications 220 via the OS 221, the first printer driver 200, or more specifically, the print instruction unit 405 issues a print instruction to the port monitor 223. The port monitor 223 transmits the print instruction to one of the image forming devices 101.

Figure 5:
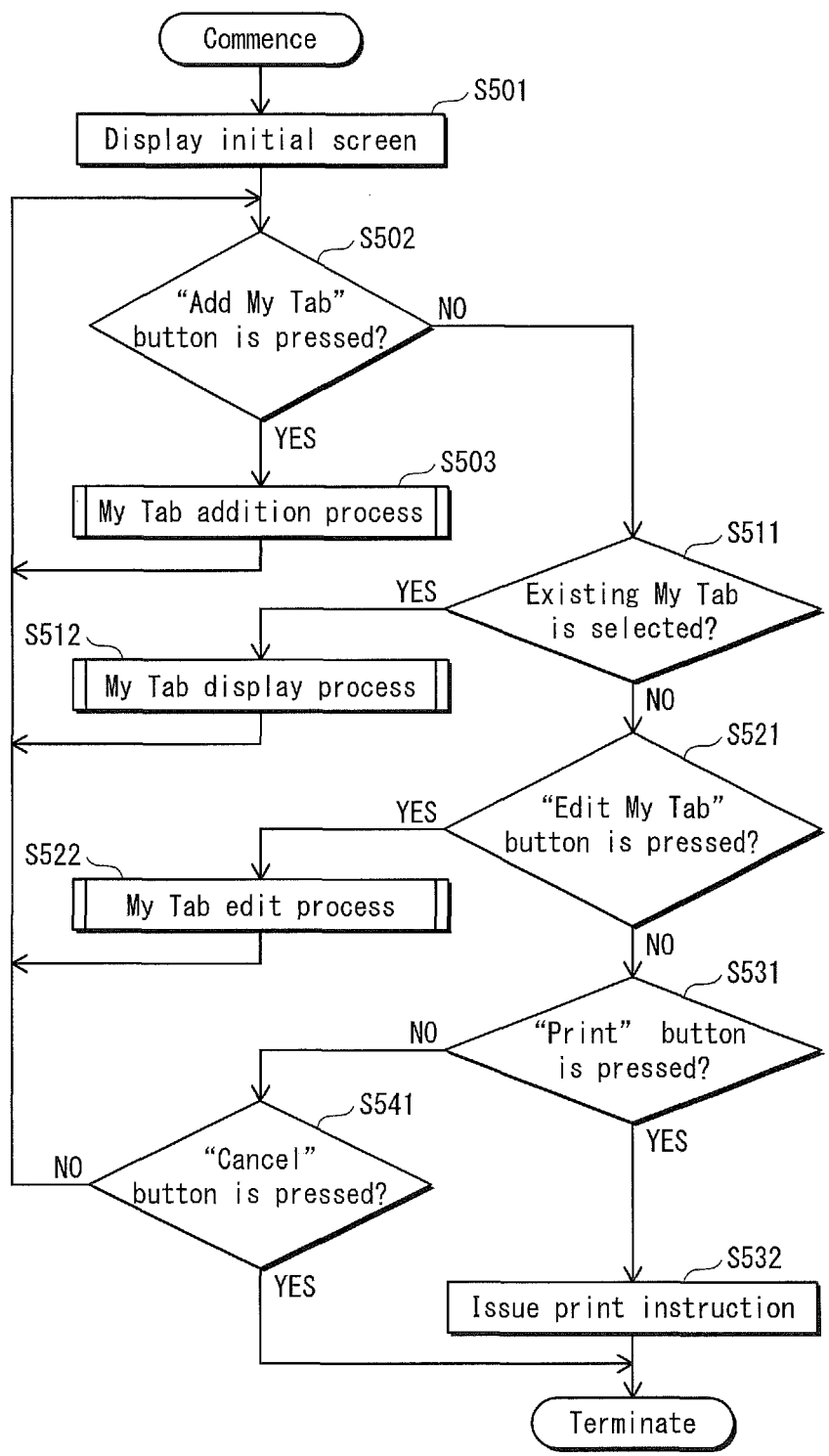
FIG. 5 is a flowchart illustrating a main operation of the first printer driver 200 in accordance with one or more embodiments of the present invention.
Figure 6:
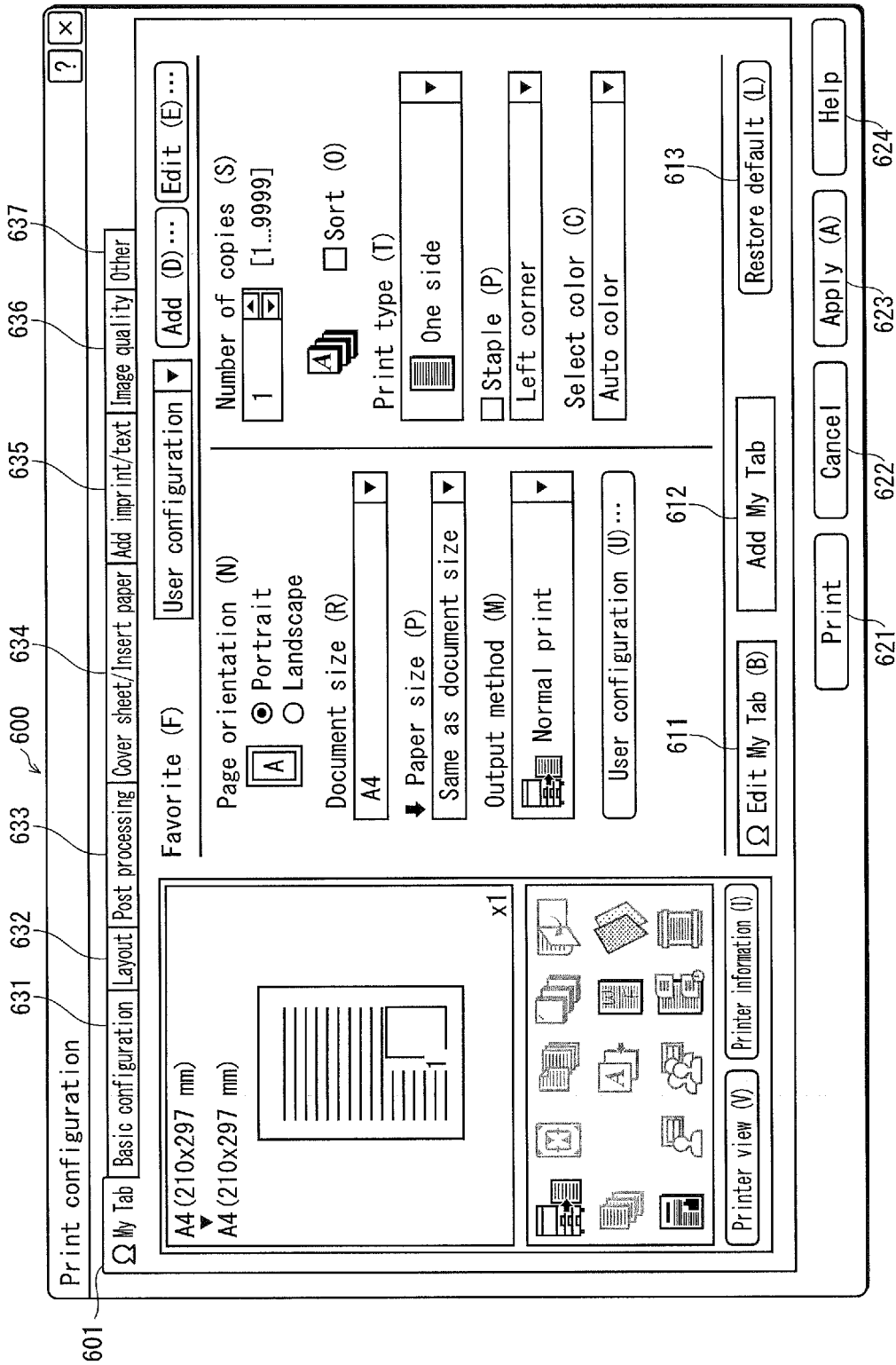
FIG. 6 is one example of an initial screen of the first printer driver 200 in accordance with one or more embodiments of the present invention.

FIG. 5 is a flowchart illustrating a main operation of the first printer driver 200 when creating a My Tab. As illustrated in FIG. 5, when the user launches the first printer driver 200, the first printer driver 200 first displays a print configuration screen as an initial screen (S501). FIG. 6 illustrates a "Print configuration" screen 600 as one example of the print configuration screen. As illustrated in FIG. 6, the "Print configuration" screen 600 includes a "My Tab" tab 601. The "My Tab" tab 601 has an "Add My Tab" button 612, which allows the user to add a new My Tab to the "Print configuration" screen 600.

The "My Tab" tab 601 includes, as well as regular configurable items such as document orientation, original document size, output method, and number of copies, the "Add My Tab" button 612 described above and an "Edit My Tab" button 611 for allowing the user to edit an existing My Tab. When the user clicks the "Add My Tab" button 612, or presses the Enter key while the "Add My Tab" button 612 is in a selected state (S502: YES), the first printer driver 200 executes a My Tab addition process for adding a new My Tab (S503).

When the user selects an existing My Tab by performing a click, etc. in the "Print configuration" screen 600 (S511: YES), the first printer driver 200 executes a My Tab display process for displaying the selected My Tab (S512). Also, when the user presses the "Edit My Tab" button 611 on the "Print configuration" screen 600 (S521: YES), the first printer driver 200 executes a My Tab edit process for editing a currently-existing My Tab (S522).

When the user presses a "Print" button 621 on the "Print configuration" screen 600 (S531: YES), the first printer driver 200 issues a print instruction (S532), closes the "Print configuration" screen 600, and terminates processing related to the "Print configuration" screen 600. When the user presses a "Cancel" button 622 on the "Print configuration" screen 600 (S541: YES), the first printer driver 200 closes the "Print configuration" screen 600 without issuing a print instruction, and terminates processing related to the "Print configuration" screen 600. After executing processes such as the My Tab addition process, the My Tab display process, and the My Tab edit process, or when NO in S541, the first printer driver 200 proceeds to S502 and repeats processing from S502.

(3-2) My Tab Addition Process

Next, the My Tab addition process (S503) is described.

Figure 7:
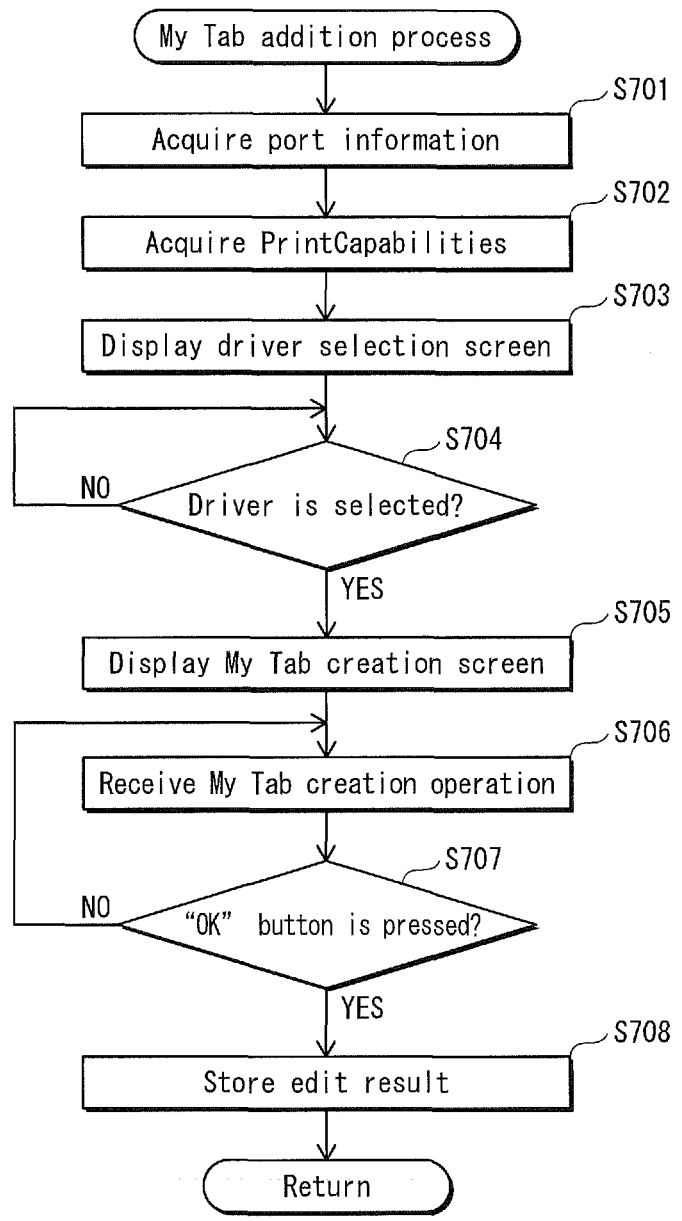
FIG. 7 is a flowchart describing a My Tab addition process in accordance with one or more embodiments of the present invention.

FIG. 7 is a flowchart describing the My Tab addition process. As illustrated in FIG. 7, the port information acquisition unit 406 first acquires names of all printing ports (S701). Next, the PrintCapabilities detection unit 402 attempts to acquire a PrintCapabilities document from the second printer driver 222 by utilizing the GetPrintCapabilities method (S702).

If the second printer driver 222 has an IPrintTicketProvider interface, the PrintCapabilities detection unit 402 successfully acquires a PrintCapabilities document corresponding to the second printer driver 222. The acquired PrintCapabilities document includes the name of the printing port corresponding to the second printer driver 222, which has returned the PrintCapabilities document.

Meanwhile, when a return value of the GetPrintCapabilities method is an error, the PrintCapabilities detection unit 402 determines that the second printer driver 222 does not have an IPrintTicketProvider interface.

Figure 8:
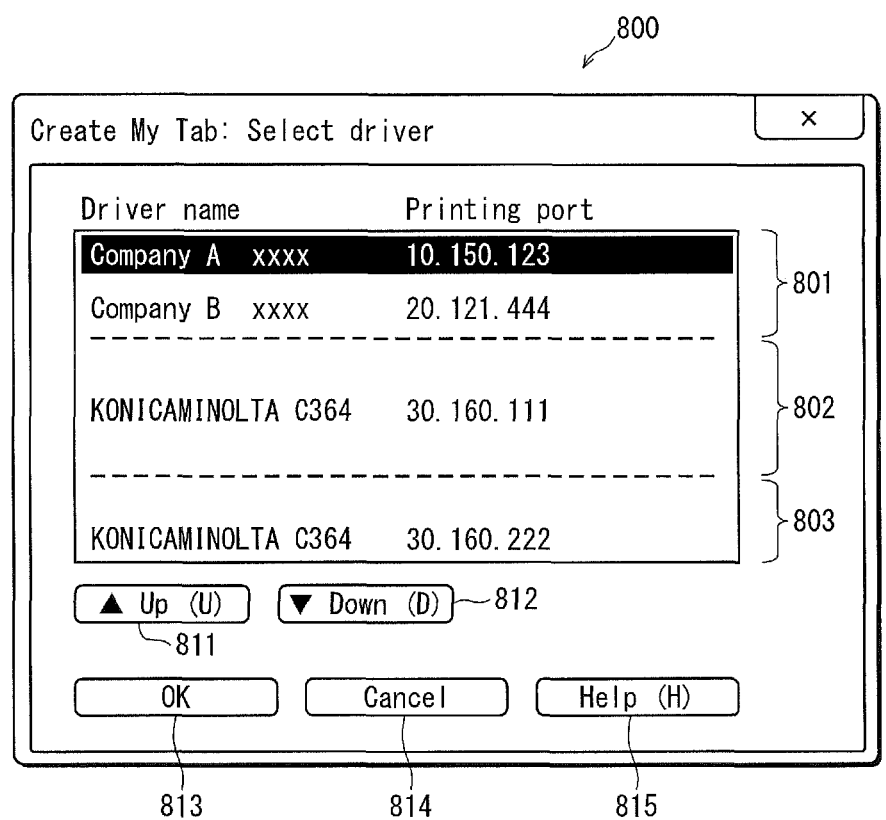
FIG. 8 is one example of a driver selection screen in accordance with one or more embodiments of the present invention.

Next, the first printer driver 200 displays a driver selection screen (S703). FIG. 8 illustrates a "Create My Tab: Select driver" screen 800 as one example of the driver selection screen. As illustrated in FIG. 8, the "Create My Tab: Select driver" screen 800 is a screen for displaying a list of printer drivers installed onto the user terminal 100 and allowing the user to select one of the listed printer drivers. The list includes a plurality of combinations each composed of a name of a printer driver and a printing port associated with the printer driver.

If the second printer driver 222 has returned a PrintCapabilities document in S702, the first printer driver 200 displays the name of the second printer driver 222 and the name of the printing port corresponding to the second printer driver 222 on the "Create My Tab: Select driver" screen 800 (801). Also, the first printer driver 200 displays the name provided to the first printer driver 200 and a name of a printing port corresponding to the first printer driver 200 on the "Create My Tab: Select driver" screen 800 (802).

Furthermore, on the "Create My Tab: Select driver" screen 800, the printing port corresponding to the second printer driver 222, when not having returned a PrintCapabilities document in S702, and a printing port for which no printer driver is installed may each be associated with the name of the first printer driver 200 (803). Alternatively, for such printing ports, the "Create My Tab: Select driver" screen 800 may include only the name of the printing ports without including printer driver names.

An "Up" button 811 and a "Down" button 812 on the "Create My Tab: Select driver" screen 800 are buttons for switching a selection candidate printer driver. As illustrated in FIG. 8, the selection candidate printer driver may be, for instance, indicated by highlighting. The user selects a desired printer driver by pressing an "OK" button 813 with the desired printer driver in highlighted state.

A "Cancel" button 814 on the "Create My Tab: Select driver" screen 800 is utilized for terminating processing related to the "Create My Tab: Select driver" screen 800 without selecting a printer driver, and a "Help" button 815 on the "Create My Tab: Select driver" screen 800 is a button for displaying a help screen which describes how to use the "Create My Tab: Select driver" screen 800.

When the user selects one of the printer drivers on the "Create My Tab: Select driver" screen 800 (S704: YES), the My Tab creation unit 404 displays a My Tab creation screen (S705) to receive a My Tab creation operation from the user (S706).

Figure 9:
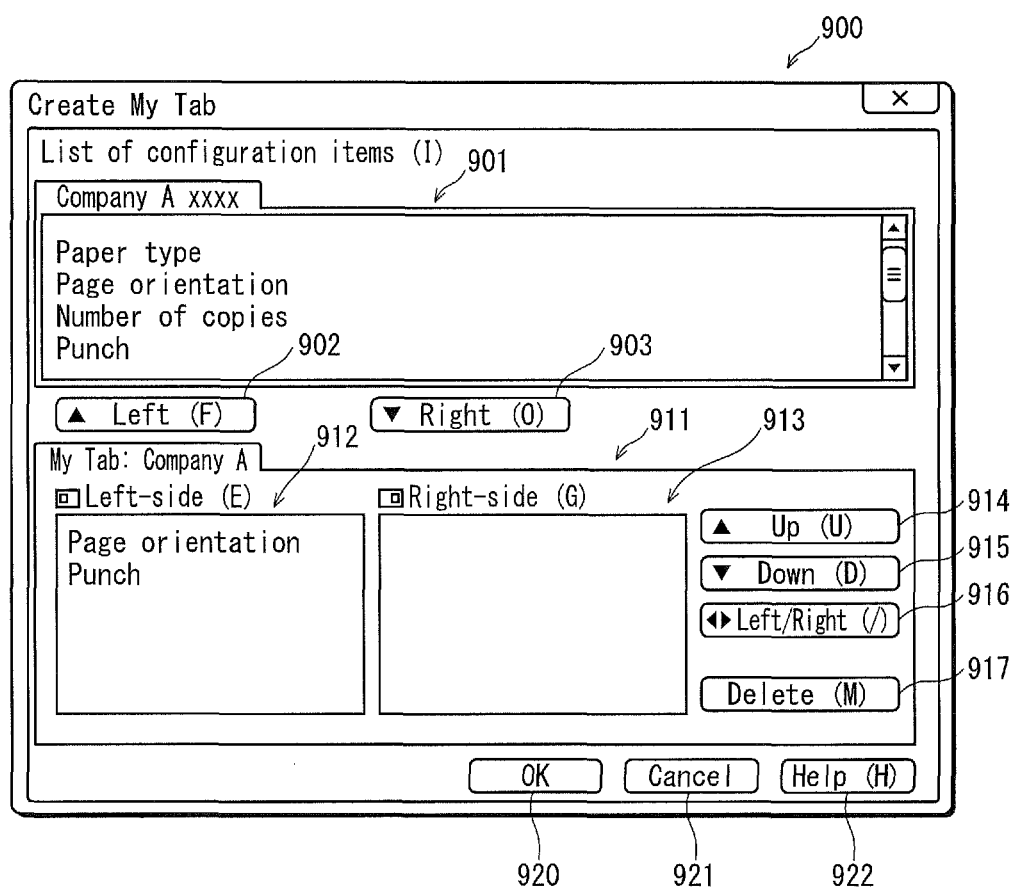
FIG. 9 is one example of a My Tab creation screen in accordance with one or more embodiments of the present invention.

FIG. 9 illustrates a "Create My Tab" screen 900 as one example of the My Tab creation screen. As illustrated in FIG. 9, the "Create My Tab" screen 900 includes a configurable item list 901 listing configurable items which the user can configure from the first printer driver 200, and a selected item list 911 listing configurable items selected from the configurable item list.

If the user selects the second printer driver 222 on the "Create My Tab: Select driver" screen 800 and the second printer driver 222 has returned a PrintCapabilities document in S702, the configurable item list 901 includes configurable items described utilizing Feature tags in the PrintCapabilities document corresponding to the second printer driver 222.

Also, when the user selects the first printer driver 200 on the "Create My Tab: Select driver" screen 800, the configurable item list 901 includes configurable items which can be configured from the first printer driver 200.

If the user selects the second printer driver 222 on the "Create My Tab: Select driver" screen 800 and the second printer driver 222 has not returned a PrintCapabilities document in S702, or selects a printing port for which no printer driver is installed on the "Create My Tab: Select driver" screen 800, the configurable item list 901 may include only basic configurable items. Such basic configurable items are, for instance, document orientation, original document size, and number of copies.

When the user selects one of the configurable items in the configurable item list 901 by performing a click, etc., the selected configurable item is, for example, indicated by highlighting and changed from an unselected state to a selected state. If the user presses a "Left" button 902 on the "Create My Tab" screen 900 with a configurable item in the selected state, the configurable item is displayed in a left-side 912 of the selected item list 911. Likewise, if the user presses a "Right" button 903 on the "Create My Tab" screen 900 with a configurable item in the selected state, the selected configurable item is displayed in a right-side 913 of the selected item list 911.

In the example illustrated in FIG. 9, two items among the configurable items displayed in the configurable item list 901, namely "Page orientation" and "Punch", are displayed in the left-side 912 of the selected item list 911. Meanwhile, no configurable item is displayed in the right-side 913 of the selected item list 911.

An "Up" button 914, a "Down" button 915, and a "Left/Right" button 916 in the selected item list 911 are buttons for changing display positions of the configurable items displayed in the selected item list 911. The "Up" button 914 and the "Down" button 915 change an upper/lower relation of the display positions of configurable items displayed in the same side (i.e., the left-side 912 or the right-side 913). The "Left/Right" button 916 is a button for transferring a configurable item from one of the left-side 912 and the right-side 913 to the other of the left-side 912 and the right-side 913. A "Delete" button 917 in the selected item list 911 is a button for deleting a configurable item from the selected item list 911.

When the user presses an "OK" button 920 on the "Create My Tab" screen 900, the first printer driver 200 completes the My Tab addition process. A "Cancel" button 921 on the "Create My Tab" screen 900 is a button for cancelling the My Tab addition process, and a "Help" button 922 on the "Create My Tab" screen 900 is a button for displaying a help screen which describes how to use the "Create My Tab" screen 900.

When the user presses the "OK" button 920 (S707: YES), the first printer driver 200 causes the edit result to be stored (S708), completes the My Tab addition process, and returns to a higher rank routine.

As such, the user is not required to switch between printer drivers each time the user changes the printing device he/she uses. Thus, the time and labor required for the user to execute printing by switching from one printer driver to another printer driver can be eliminated.

(3-3) My Tab Display Process

Next, the My Tab display process (S512) is described.

Figure 10:
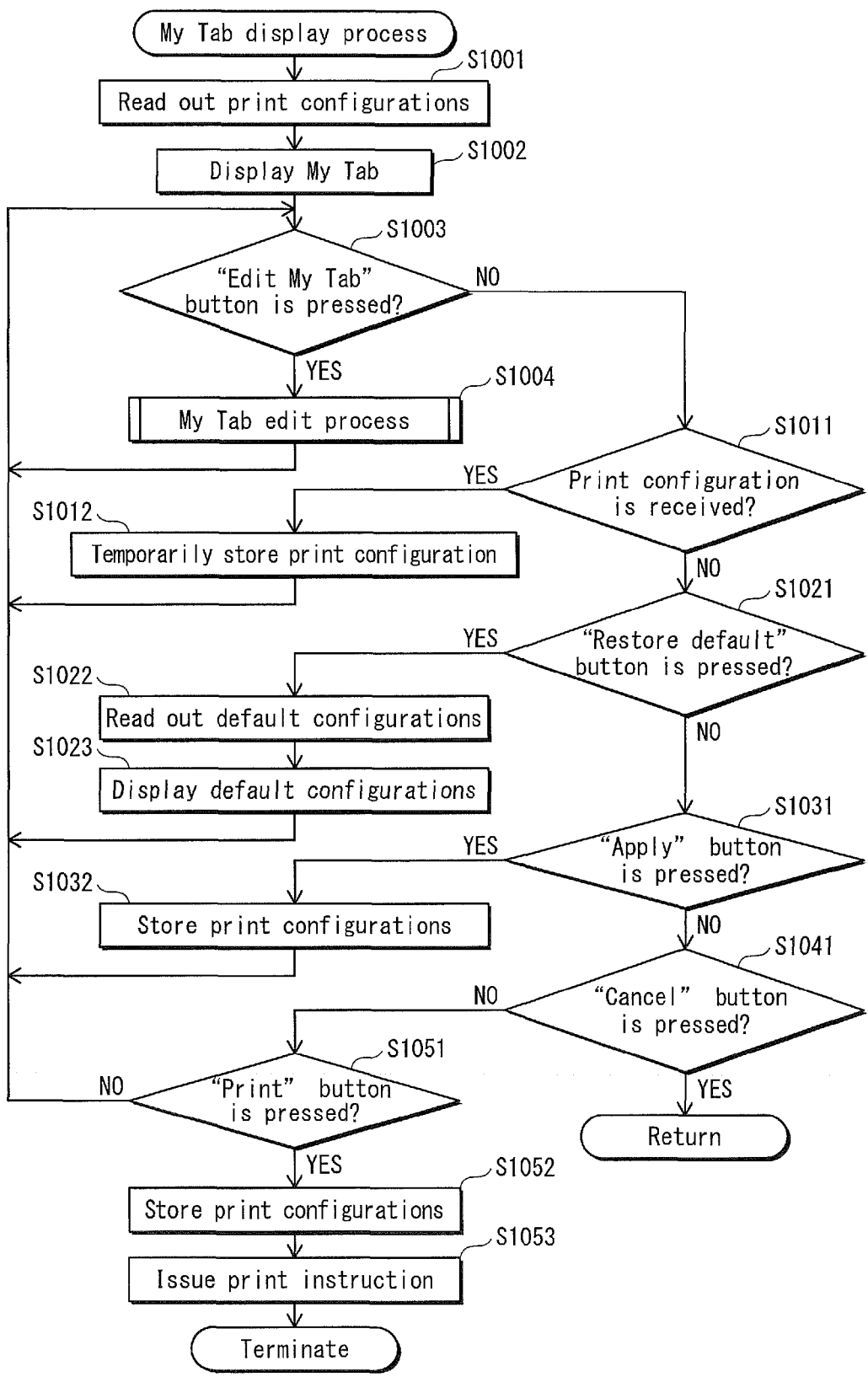
FIG. 10 is a flowchart describing a My Tab display process in accordance with one or more embodiments of the present invention.

FIG. 10 is a flowchart describing the My Tab display process. As illustrated in FIG. 10, in the My Tab display process, the My Tab display unit 403 reads out one or more print configurations which the print configuration storage unit 401 stores with regard to the My Tab selected (S1001), and displays the selected My Tab (S1002). Here, the print configurations which are read out in S1001 are displayed in the selected My Tab and presented to the user. Note that the user is able to make changes to the print configurations displayed in the selected My Tab.

It can be expected that the user, when switching from a first image forming device among the image forming devices 101 to a second image forming device among the image forming devices 101, desires to utilize a function which the first image forming device does not have but the second image forming device has. Also, it is likely that a print configuration that the user, who has used such a function in the past, makes with respect to the function is similar to a print configuration the user has already made with respect to the function in the past.

Therefore, as described above, storing a print configuration which the user has made on a My Tab in the past in the print configuration storage unit 401 and automatically displaying the print configuration the next time the My Tab is displayed eliminates the time and labor required for the user to make a print configuration. Also, because the user can make changes to the print configurations at the user's desire, automatic display of print configurations reflecting the user's desire is possible.

Figure 11:
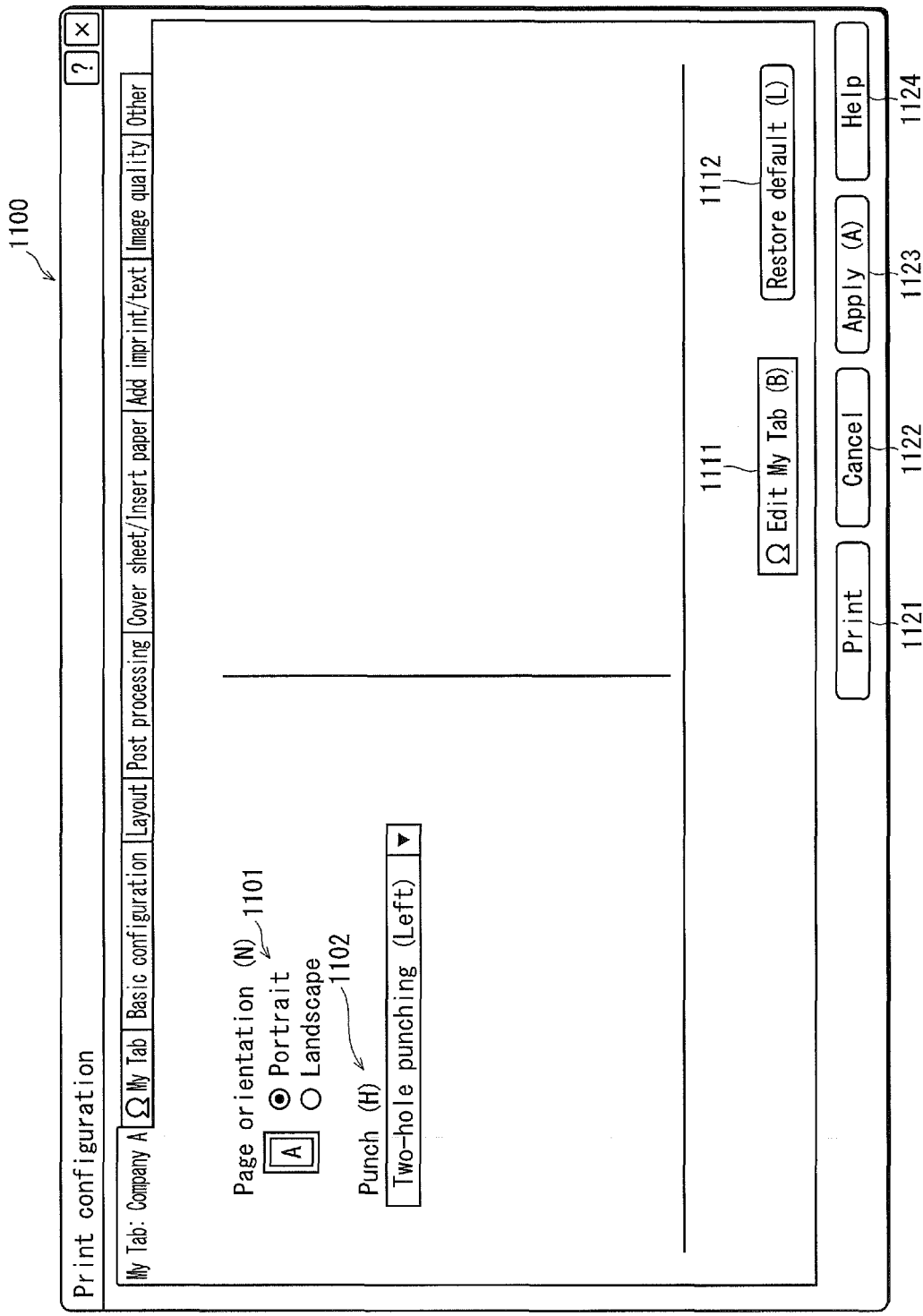
FIG. 11 is one example of a My Tab display screen in accordance with one or more embodiments of the present invention.

FIG. 11 illustrates a My Tab display screen 1100 as one example of a My Tab display screen. The My Tab display screen 1100 is a screen showing a "My Tab: Company A", and includes "Page orientation" 1101 and "Punch" 1102 as print configurable items. The print configuration for "Page orientation" 1101 is "Portrait", and the print configuration for "Punch" 1102 is "two-hole punching". In addition, buttons such as an "Edit My Tab" button 1111, a "Restore default" button 1112, and a "Print" button 1121 are displayed in the "My Tab: Company A".

When the user presses the "Edit My Tab" button 1111 on the My Tab display screen 1100 (S1003: YES), a My Tab edit screen for editing the My Tab currently displayed is displayed, and the My Tab edit process is executed (S1004). In the example in FIG. 11, because the "My Tab: Company A" is currently displayed, a My Tab edit screen for editing the "My Tab: Company A" is displayed when the user presses the "Edit My Tab" button 1111. The My Tab edit process is described later.

When receiving a print configuration from the user on the My Tab display screen 1100 (S1011: YES), the print configuration is temporarily stored to the RAM 203 (S1012). It goes without saying that the print configuration displayed on the My Tab display screen 1100 changes in accordance with the print configuration from the user.

When the user presses the "Restore default" button 1112 on the My Tab display screen 1100 (S1021: YES), a default configuration (a default value) is read out from the print configuration storage unit 401 (S1022) for each configurable item in the My Tab currently displayed, and the current print configuration for each configurable item is replaced with the default configuration (S1023). The default configuration may be stored in the My Tab display unit 403, instead of in the print configuration storage unit 401. Note that when a given configurable item is included in two or more My Tabs, the default configuration for the configurable item may differ between the two or more My Tabs.

When the user presses an "Apply" button 1123 on the My Tab display screen 1100 (S1031: YES), print configurations currently displayed are stored to the print configuration storage unit 401 (S1032). When the user presses a "Cancel" button 1122 on the My Tab display screen 1100 (S1041: YES), the first printer driver 200 discards the print configurations currently displayed, and returns to a higher rank routine.

When the user presses the "Print" button 1121 on the My Tab display screen 1100 (S1051: YES), the print instruction unit 405 stores the print configurations currently displayed to the print configuration storage unit 401 (S1052), causes the port monitor 223 to issue a print instruction to a printing port associated with the My Tab currently displayed (S1053), and completes processing related to the My Tab display screen 1100. Accordingly, a print instruction is transmitted to one of the image forming devices 101 corresponding to the printing port associated with the My Tab currently displayed.

Note that when a print configuration exists for a configurable item that is not displayed on the My Tab currently displayed, the print instruction transmitted by the print instruction unit 405 includes such a print configuration. Also, after the processes in S1004, S1012, or S1023, or when NO in S1051, the print instruction unit 405 proceeds to S1003 and repeats processing from S1003.

(3-4) My Tab Edit Process

Next, the My Tab edit process is described. The My Tab edit process is executed when the user presses the "Edit My Tab" button 611 on the "Print configuration" screen 600 or the user presses the "Edit My Tab" button 1111 on the My Tab display screen 1100.

Figure 12:
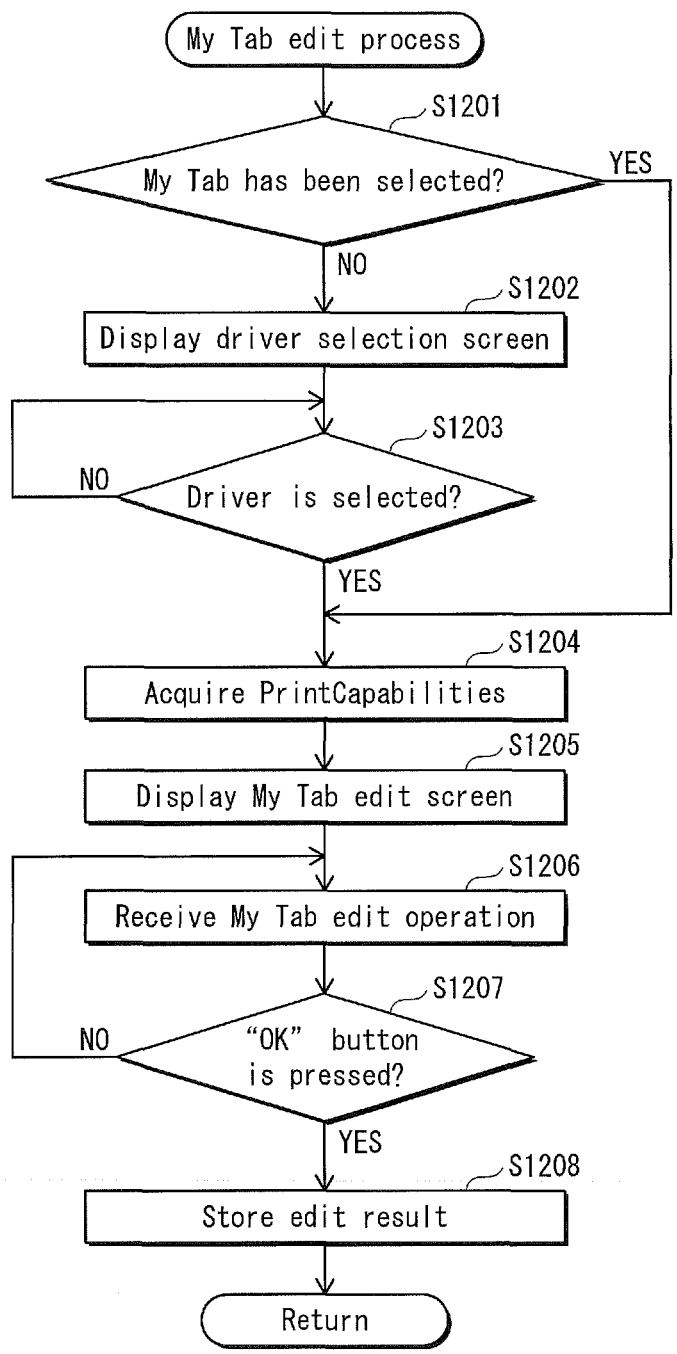
FIG. 12 is a flowchart describing a My Tab edit process in accordance with one or more embodiments of the present invention.

FIG. 12 is a flowchart describing the My Tab edit process. As illustrated in FIG. 12, in the My Tab display process, the My Tab display unit 403 first determines whether or not the user has already selected one My Tab. When the user presses the "Edit My Tab" button 611 on the "Print configuration" screen 600, a determination is made that the user has not yet selected one My Tab because the edit-target My Tab is yet to be determined Meanwhile, when the user presses the "Edit My Tab" button 1111 on the My Tab display screen 1100, a determination is made that the user has already selected one My Tab because it can be assumed that the user wishes to edit the My Tab currently displayed.

Figure 13:
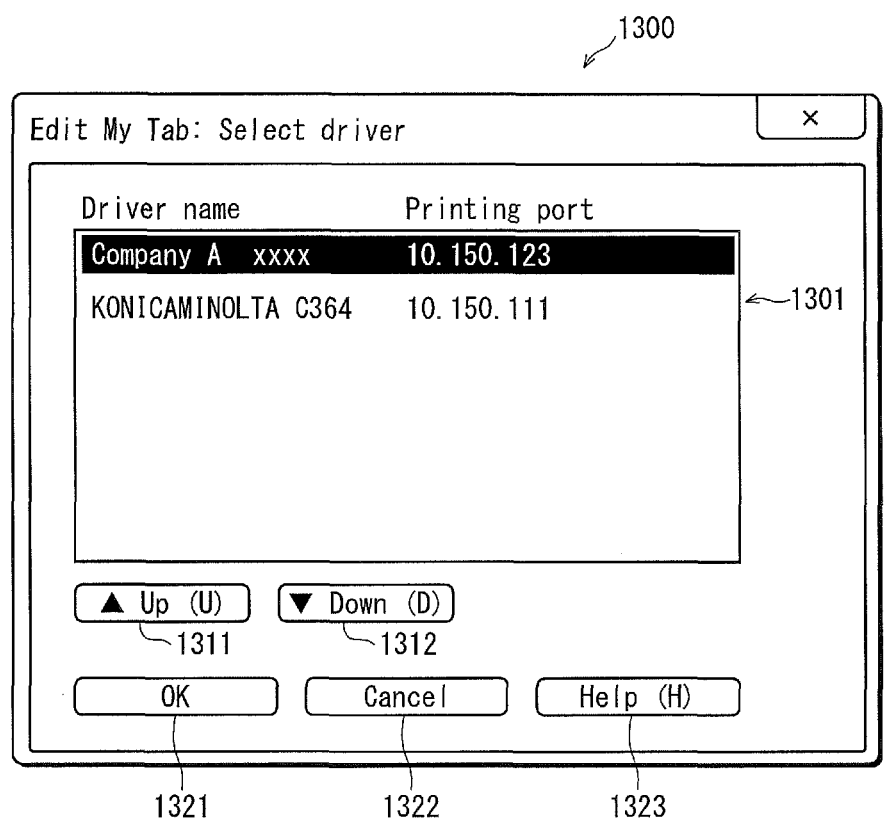
FIG. 13 is one example of a "Edit My Tab: Select driver" screen in accordance with one or more embodiments of the present invention.

When the edit-target My Tab is not yet selected (S1201: NO), a "Edit My Tab: Select driver" screen is displayed (S1202). FIG. 13 illustrates an "Edit My Tab: Select driver" screen 1300 as one example of the "Edit My Tab: Select driver" screen. The "Edit My Tab: Select driver" screen 1300 includes a list 1301 of names of printing ports each corresponding to one second printer driver 222 for which a My Tab has been created, and an "Up" button 1311 and a "Down" button 1312. Specifically, the second printer driver 222 that the user selects by using the "Up" button 1311 and the "Down" button 1312 is indicated by highlighting.

When the user presses an "OK" button 1321 on the "Edit My Tab: Select driver" screen 1300, the second printer driver 222 that is currently highlighted is selected. Meanwhile, when the user presses a "Cancel" button 1322 on the "Edit My Tab: Select driver" screen 1300, the first printer driver 200 terminates the My Tab edit process. A "Help" button 1323 on the "Edit My Tab: Select driver" screen 1300 has substantially the same function as other "Help" buttons described above.

When one second printer driver 222 is selected on the "Edit My Tab: Select driver" screen 1300 (S1203: YES), the PrintCapabilities detection unit 402 acquires a PrintCapabilities document from the selected second printer driver 222 (S1204). Further, based on the acquired PrintCapabilities document, the My Tab creation unit 404 displays a My Tab edit screen (S1205).

Figure 14:
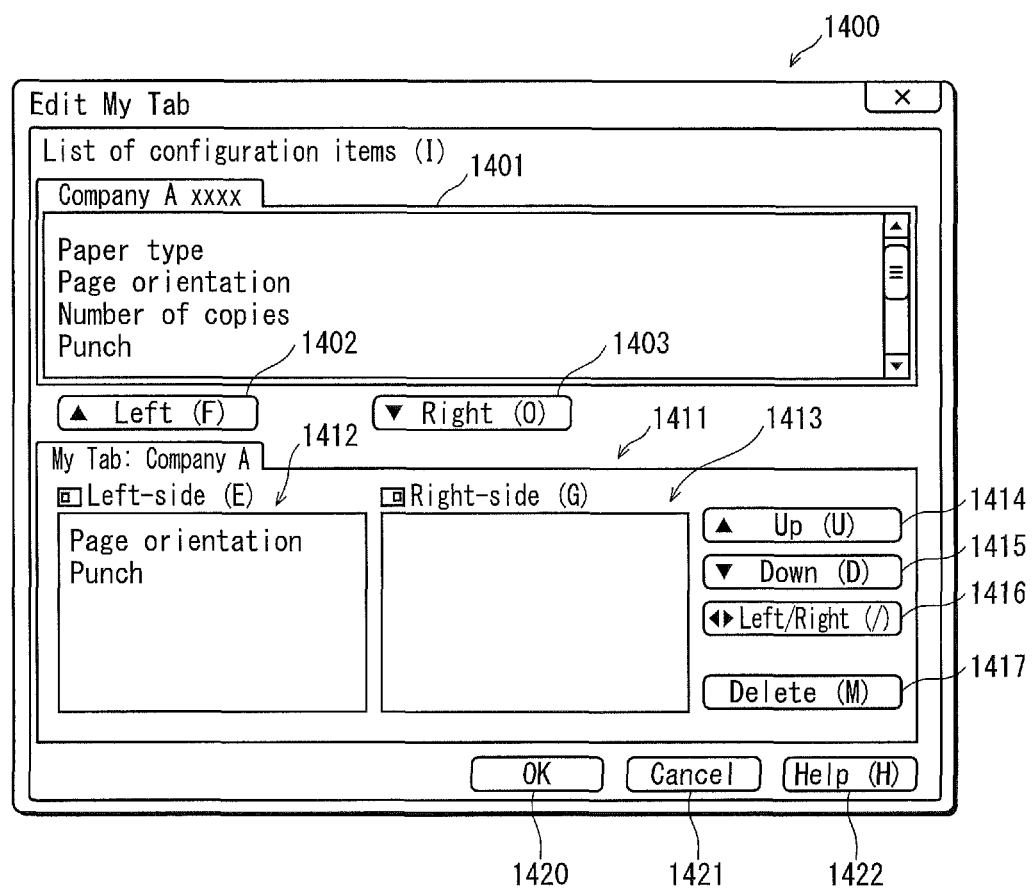
FIG. 14 is one example of a My Tab edit screen in accordance with one or more embodiments of the present invention.

FIG. 14 illustrates an "Edit My Tab" screen 1400 as one example of the My Tab edit screen in the above-described case. The "Edit My Tab" screen 1400 has substantially the same configuration as the "Create My Tab" screen 900 illustrated in FIG. 9, and is utilized by the user substantially in the same manner as the "Create My Tab" screen 900. When the My Tab creation unit 404 receives a My Tab edit operation on the "Edit My Tab" screen 1400 (S1206) and the user presses an "OK" button 1420 on the "Edit My Tab"

screen 1400 (S1207: YES), the My Tab creation unit 400 causes the edit result to be stored (S1208), and processing returns to a higher rank routine.

[4] Modification

The present invention is not limited to the above embodiments. For example, the modifications as follows can be provided.

(1) In one or more of the above embodiments, the user makes a print instruction on the My Tab display screen 1100, but it goes without saying that the present invention is not limited to this, and may be modified as follows. That is, the user may make a print instruction without the My Tab display screen 1100 being displayed, by selecting a second printer driver 222.

Figure 15:
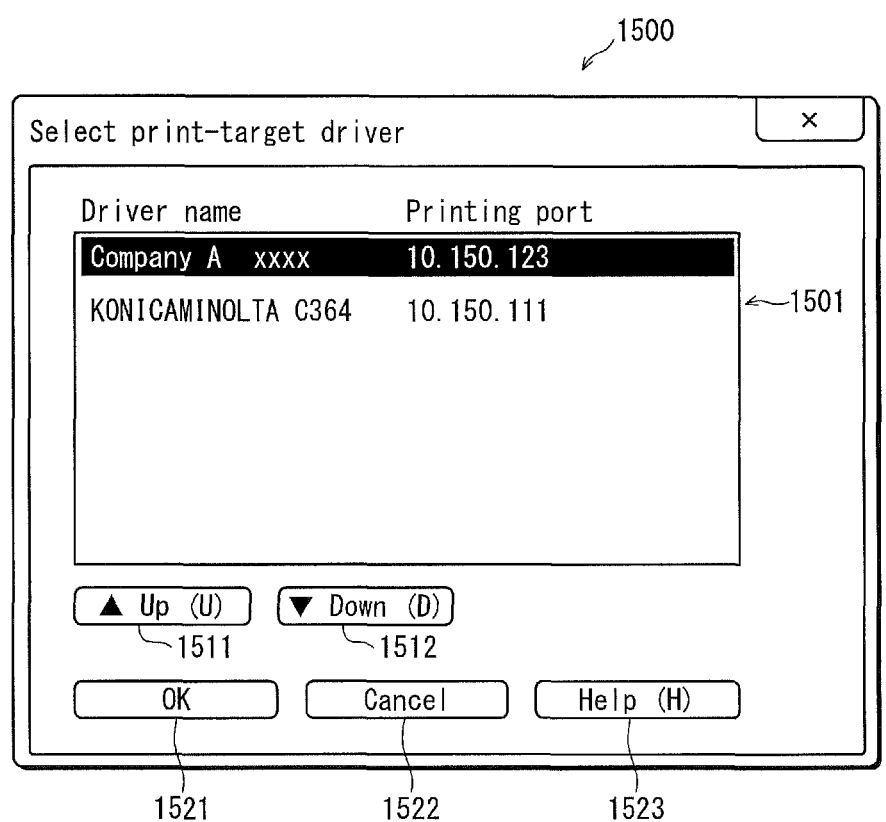
FIG. 15 is one example of a print-target driver selection screen in accordance with one or more embodiments of the present invention.

FIG. 15 illustrates one example of a print-target driver selection screen which is a screen allowing the user to select a printer driver to which a print instruction is to be issued. FIG. 15 illustrates a "Select print-target driver" screen 1500, which is one example of the print-target driver selection screen. The "Select print-target driver" screen 1500 includes a list 1501 including names of printer drivers and printing ports, and an "Up" button 1511 and a "Down" button 1512. Specifically, the print-target driver that the user designates by using the "Up" button 1511 and the "Down" button 1512 is indicated by highlighting When a user presses an "OK" button 1521 on the "Select print-target driver" screen 1500 with a printer driver being designated, a print instruction is issued to the designated print-target driver. The print instruction includes print configurations read out from the print configuration storage unit 401. Meanwhile, when the user presses a "Cancel" button 1522 on the "Select print-target driver" screen 1500, the "Select print-target driver" screen 1500 disappears. A "Help" button 1523 in the "Select print-target driver" screen 1500 has substantially the same function as other "Help" buttons described above. Note that in order to enable displaying of the "Select print-target driver" screen 1500, for instance, a button dedicated to displaying the "Select print-target driver" screen 1500 may be provided on the "Print configuration" screen 600.

When making this modification, the user is not required to switch between printer drivers each time the user changes the printing device he/she uses. Thus, this modification also eliminates the time and labor required for the user to execute printing by switching from one printer driver to another printer driver.

(2) In one or more of the above embodiments, a case in which the latest print configuration made with respect to a configurable item is stored to the print configuration storage unit 401 is described, but it goes without saying that the present invention is not limited to this, and may be modified as follows. That is, the print configuration storage unit 401 may store, for a configurable item, a record of print configurations for the configurable item included in print instructions having been issued. When making this modification, in response to a request for a print configuration for a configurable item, the print configuration storage unit 401 may output the print configuration most frequently made.

When making such a modification, the calculation of the frequency at which each print configuration is made may be executed for each configurable item. Alternatively, the print configuration storage unit 401 may store, for a given printer driver, a record of combinations of print configurations included in print instructions issued to the printer driver. When making this modification, the print configuration storage unit 401 may output the most-frequently used combination of print configurations when issuing a print instruction to the printer driver. Such modifications allow outputting print configurations conforming to the actual state of use by the user, and thus eliminates the time and labor required for the user to make changes to print configurations.

Also, when Microsoft Windows (a registered trademark) is utilized as the OS 221, a modification may be made such that print configurations are temporarily stored to a registry. This modification allows the OS 221 to later store print configurations to the HDD 207; which is a nonvolatile storage device. That is, such a modification enables print configurations to be stored to a nonvolatile memory even when the first printer driver 200 is not displayed.

Also, the first printer driver 200 may directly store print configurations to a nonvolatile storage device (such as the HDD 207 or a nonvolatile semiconductor memory).

Also, when the user terminal 100 is shared by a plurality of users and each of the users has a different login name, print configurations for a given user (login name) may be stored separately from print configurations for another user (login name). This modification allows making print configurations conforming to the actual state of use by the users, since different users may make different print configurations.

(3) In one or more of the above embodiments, a case in which Microsoft Windows (a registered trademark) is used as the OS 221 is described, but it goes without saying that the present invention is not limited to this, and an OS other than Microsoft Windows (a registered trademark) may be used. However, even when an OS other than Microsoft Windows (a registered trademark) is used, the first printer driver 200 may be capable of acquiring configurable items for second printer drivers 222.

When utilizing an OS other than Microsoft Windows (a registered trademark), the first printer driver 200 may acquire configurable items directly from second printer drivers 222, which is similar to when using the XPS printing system. Also, a modification may be made such that configurable items for the second printer drivers 222 are stored in a location other than the second printer drivers 222, such as in the OS 221, in which case the first printer driver 200 may acquire configurable items for the second printer drivers 222 by referring to information related to the configurable items stored in such location.

(4) In one or more of the above embodiments, description is provided mainly focusing on a configuration for allowing the first printer driver 200 to issue a print instruction to an image forming device 101 that corresponds to a second printer driver 222, but it goes without saying that the first printer driver 200, similar to conventional printer drivers, can receive a print configuration from the user and issue a print instruction based on the print configuration to an image forming device 101 corresponding to the first printer driver 200.

Specifically, by utilizing one or more of tabs 631-637 in FIG. 6, the user can make print configurations related to the image forming device 101 corresponding to the first printer driver 200. Also, by pressing the "Print" button 621 provided on the "Print configuration" screen 600, the user can issue a print instruction to the image forming device 101 corresponding to the first printer driver 200. Further, a modification may be made of providing a "Print" button to at least one of the tabs 631-637, in which case the user is able to issue a print instruction to the image forming device 101 corresponding to the first printer driver 200 by using the "Print" button so provided.

(5) In one or more of the above embodiments, description is provided mainly focusing on the first printer driver 200 and the user terminal 100, which has the first printer driver 200 installed thereon and serves as a configuration presentation device presenting print configurations, but it goes without saying that the present invention is not limited to this. That is, one or more embodiments of the present invention may be a configuration presentation method that the user terminal 100 utilizes by executing the first printer driver 200. The configuration presentation method pertaining to the present invention can achieve the same effects as one or more of the above embodiments.

Also, one or more embodiments of the present invention may be a computer-readable recording medium having the first printer driver 200 recorded thereon. The computer-readable recording medium may be a non-transitory recording medium such as a magnetic disk, one example of which is a flexible disk, an optical recording medium such as a DVD-ROM, and a recording medium of a flash memory or a similar type. The first printer driver 200 may be produced, transferred etc., in the form of the recording medium. Alternatively, the first printer driver 200 may be transmitted and supplied as a computer program via various kinds of wired or wireless networks such as the Internet, via broadcasting, via an electrical communication line, via a satellite communication, or the like.

(6) Print instructions issued by the user terminal 100 and transmitted to the image forming devices 101 are described in page description language. Here, note that the page description language that the user terminal 100 uses to compose a print instruction for one image forming device 101 may differ from the page description language that the user terminal 100 uses to compose a print instruction for another image forming device 101. Therefore, it is desirable that the first printer driver 200 describe a print instruction to be issued with respect to a given image forming device 101 in the page description language suitable for the image forming devices 101, or in other words, it is desirable that the first printer driver 200 describe a print instruction to be output from a given printing port in the page description language suitable for the printing port. This enables issuing print instructions to image forming devices 101 of even more types, which eliminates the time and labor required for the user to switch between different printer drivers.

[5] Summary

One aspect of one or more embodiments of the present invention is a non-transitory computer-readable recording medium having recorded thereon a printer driver allowing a computer including a nonvolatile memory to issue a print instruction causing a printing device to execute printing, the printer driver causing the computer to execute: a display step of displaying a plurality of separate reception regions, the reception regions each corresponding to a different printing device and each including one or more configurable items that are related to printing and variable from reception region to reception region; a storing step of, when receiving a configuration with respect to a configurable item included in one of the reception regions, storing the received configuration to the nonvolatile memory so that the received configuration is associated with a printing device corresponding to the one of the reception regions; and a presenting step of, when receiving a designation of one printing device corresponding to one of the reception regions, reading out each configuration associated with the one printing device from the nonvolatile memory, and presenting the each configuration so that the each configuration is usable in issuing a print instruction to the one printing device.

In this manner, when issuing a print instruction to a first printing device differing from a second printing device to which a previous print instruction was issued, print configurations stored in the nonvolatile memory that correspond to the first printing device are read out and presented. Consequently, a print instruction can be issued to the first printing device without the necessity of making print configurations with respect to individual functions of the first printing device once again. This simplifies user operations when issuing a print instruction to the first printing device.

In the recording medium pertaining to one aspect of one or more embodiments of the present invention, the storing step may associate a printing device with a configuration by associating a port of the computer for outputting a print instruction to the printing device with the configuration, and the presenting step may receive a designation of a printing device by receiving a designation of a port of the computer for outputting a print instruction to the printing device.

Also, in the recording medium pertaining to one aspect of one or more embodiments of the present invention, the printer driver may cause the computer to display each of the reception regions by further causing the computer to execute: an acquiring step of acquiring configurable items from another printer driver that is installed onto the computer; and a selecting step of having a user of the computer select the configurable items in the reception region from among the configurable items acquired in the acquiring step.

In this manner, only configurable items which the user assumes are necessary are displayed, and other configurable items are not displayed. Because of this, items which the user wishes to configure can be displayed to be easily viewable. Also, the user can easily find a configurable item which the user wishes to configure.

Also, in the recording medium pertaining to one aspect of one or more embodiments of the present invention, the other printer driver may have an IPrintTicketProvider interface, and in the acquiring step, the configurable items may be acquired from the other printer driver by acquiring a PrintCapabilities document from the other printer driver.

Also, in the recording medium pertaining to one aspect of one or more embodiments of the present invention, the printer driver may further cause the computer to execute: an updating step of updating a given one of the reception regions by performing at least one of: (i) at least one of adding a new configurable item to the given one of the reception regions and deleting a configurable item from the given one of the reception regions, and (ii) changing a display position of a configurable item in the given one of the reception regions.

In this manner, configurable items for which print configurations are stored in the nonvolatile memory can be changed, and the display position of the configurable items can be changed to be easily viewable.

Also, in the recording medium pertaining to one aspect of one or more embodiments of the present invention, the display step may display each reception region as a single tab, based on a tabbed document interface.

Also, in the recording medium pertaining to one aspect of one or more embodiments of the present invention, the printer driver may further cause the computer to execute an adding step of causing the display step to display a new reception region in addition to reception regions that are currently displayed. In the recording medium pertaining to one aspect of one or more embodiments of the present invention, the printer driver may further cause the computer to execute: a driver detection step of detecting one or more other printer drivers that the computer is capable of executing; a list displaying step of displaying a list of the other printer drivers; and a selection receiving step of receiving a selection of one of the other printer drivers, and the new reception region added by the adding step may correspond to the selected one of the other printer drivers.

Also, in the recording medium pertaining to one aspect of one or more embodiments of the present invention, the printer driver may further cause the computer to execute a print instructing step of, when a configuration is received via a given reception region, issuing a print instruction to a printing device corresponding to the given reception region, the instruction being described in page description language.

In this manner, print instructions can be issued to more types of printing devices compared to when print instructions can be issued by using only one type of page description language.

Also, in the recording medium pertaining to one aspect of one or more embodiments of the present invention, in the presenting step, the each configuration may be presented in a reception region via which the each configuration has been received. That is, the reception regions may also be utilized as presentation regions for presenting print configurations.

Another aspect of one or more embodiments of the present invention is a configuration presentation method in which a computer including a nonvolatile memory is used to present a print configuration according to which a print instruction is to be issued to a printing device, including: a display step of displaying a plurality of separate reception regions, the reception regions each corresponding to a different printing device and each including one or more configurable items that are related to printing and variable from reception region to reception region; a storing step of, when receiving a configuration with respect to a configurable item included in one of the reception regions, storing the received configuration to the nonvolatile memory so that the received configuration is associated with a printing device corresponding to the one of the reception regions; and a presenting step of, when receiving a designation of one printing device corresponding to one of the reception regions, reading out each configuration associated with the one printing device from the nonvolatile memory, and presenting the each configuration so that the each configuration is usable in issuing a print instruction to the one printing device.

Yet another aspect of one or more embodiments of the present invention is a configuration presentation device for presenting a print configuration according to which a print instruction is to be issued to a printing device, including: a display unit displaying a plurality of separate reception regions, the reception regions each corresponding to a different printing device and each including one or more configurable items that are related to printing and variable from reception region to reception region; a nonvolatile memory, when receiving a configuration with respect to a configurable item included in one of the reception regions, storing the received configuration so that the received configuration is associated with a printing device corresponding to the one of the reception regions; and a presenting unit, when receiving a designation of one printing device corresponding to one of the reception regions, reading out each configuration associated with the one printing device from the nonvolatile memory, and presenting the each configuration so that the each configuration is usable in issuing a print instruction to the one printing device.

The configuration presentation method and the configuration presentation device each pertaining to one aspect of one or more embodiments of the present invention also achieve the above-described advantages of the present invention.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A non-transitory computer-readable recording medium having recorded thereon a printer driver allowing a computer including a nonvolatile memory to issue a print instruction to a plurality of printing devices including a first printing device and a second printing device, the printer driver causes the computer to:
   display a first configuration tab that includes a configurable item corresponding to the first printing device on a display of the computer;
   execute a configuration tab edit process when a user edits the configurable item in the first configuration tab;
   receive a configuration for the configurable item from the user when the user edits the configuration item in the first configuration tab;
   store the configuration in the nonvolatile memory so that the configuration is associated with the first printing device; and
   when the user selects the first configuration tab when a second configuration tab is displayed on the display, retrieve the configuration from the nonvolatile memory and display the first configuration tab with the configuration on the display,
   wherein the first and second configuration tabs represent the first and second printing devices, respectively, and
   wherein the configuration tabs include one or more configuration items that are related to printing, and
   the plurality of printing devices to execute printing based on the print instruction issued from the computer.

2. The recording medium of claim 1, wherein the printer driver further causes the computer to:
   associate each of the plurality of printing devices with the configuration by associating a port of the computer for outputting a print instruction to each of the plurality of printing devices with the configuration when receiving the configuration; and
   receive a designation of each of the plurality of printing devices by receiving a designation of the port of the computer for outputting the print instruction to each of the plurality of printing devices.

3. The recording medium of claim 1, wherein the printer driver further causes the computer to:
   acquire first configurable items from another printer driver that is installed onto the computer; and
   allow the user of the computer to select the configurable items in each of the configuration tabs from among the first configurable items.

4. The recording medium of claim 3, wherein
   the other printer driver has an IPrintTicketProvider interface, and
   the first configurable items are acquired from the other printer driver by acquiring a PrintCapabilities document from the other printer driver.

5. The recording medium or claim 1, wherein the printer driver further causes the computer to:
update a given one of the configuration tabs by performing at least one of:
(i) adding is new configurable item to the given one of the configuration tabs and deleting a configurable item from the given one of the configuration tabs; and
(ii) changing a display position of a configurable item in the given one of the configuration tabs.

6. The recording medium of claim 1, wherein
each of the configuration tabs is displayed as a single tab, based on a tabbed document interface.

7. The recording medium of claim 1, wherein the printer driver further causes the computer to
display a new configuration tab in addition to the configuration tabs that are currently displayed.

8. The recording medium of claim 7, wherein the printer driver further causes the computer to:
detect one or more other printer drivers that the computer is capable of executing;
display a list of the other printer drivers; and
receive a selection of one of the other printer drivers, wherein
the new configuration tab corresponds to the selected one of the other printer drivers.

9. The recording medium of claim 1, wherein the printer driver further causes the computer to issue, when a configuration is received via a given configuration tab, a print instruction to a printing device corresponding to the given configuration tab, the instruction being described in page description language.

10. The recording medium of claim 1, wherein
each configuration is presented in a configuration tab via which the each configuration has been received.

11. A configuration presentation method in which a computer including a nonvolatile memory is used to present a print configuration according to which a print instruction is to be issued to a plurality of printing devices including a first printing device and a second printing device, comprising:
causing the computer to:
display a first configuration tab that includes a configurable item corresponding to the first printing device on a display of the computer;
execute a configuration tab edit process when a user edits the configurable item in the first configuration tab;
receive, with a central process unit, CPU, of the computer, a configuration for the configurable item from the user when the user edits the configuration item in the first configuration tab;
store the configuration in the nonvolatile memory so that the configuration is associated with the first printing device; and
when the user selects the first configuration tab when a second configuration tab is displayed on the display,
retrieve, with the CPU, the configuration from the nonvolatile memory, and
display the first configuration tab with the configuration on the display,
wherein the first and second configuration tabs represent the first and second printing devices, respectively, and
wherein the configuration tabs include one or more configurable items that are related to printing, and
causing the plurality of printing devices to execute printing based on the print instruction issued from the computer.

12. The configuration presentation method or claim 11, further comprising:
updating a given one of the configuration tab by performing at least one of:
(i) adding a new configurable item to the given one of the configuration tabs and deleting a configurable item from the given one of the configuration tabs; and
(ii) changing a display position of a configurable item in the given one of the configuration tabs.

13. A configuration presentation device for presenting a print configuration according to which a print instruction is to be issued to a plurality of printing devices including a first printing device and a second printing device from a computer, comprising:
a display that displays at first configuration tab that includes a configurable item corresponding to the first printing device;
a central process unit, CPU, that:
executes a configuration tab edit process when a user edits the configuration item in the first configuration tab, and
receives a configuration for the configurable item from the user when the user edits the configuration item in the first configuration tab; and
a nonvolatile memory that stores the configuration so that the configuration is associated with the first plurality device, wherein
when the user selects the first configuration tab when a second configuration tab is displayed on the display,
the CPU retrieves the configuration from the nonvolatile memory, and
the display displays the first configuration tab with the configuration, and
the first and second configuration tabs represent the first and second printing devices, respectively,
the configuration tabs include one or more configurable items that are related to printing, and
the plurality of printing devices executes printing based on the print instruction issued from the computer.

14. The configuration presentation device of claim 13, wherein the CPU updates a given one of the configuration tabs by performing at least one of:
(i) adding a new configurable item to the given one of the configuration tabs and deleting a configurable item from the given one of the configuration tabs; and
(ii) changing a display position or a configurable item in the given one of the configuration tabs.

* * * * *